United States Patent

[11] 3,620,987

[72] Inventors Alexander M. McLaughlin;
 James S. Rose, both of Guilford, Conn.
[21] Appl. No. 878,875
[22] Filed Nov. 21, 1969
[45] Patented Nov. 16, 1971
[73] Assignee The Upjohn Company
 Kalamazoo, Mich.

[54] PREPARATION OF POLYMER FOAM
 14 Claims, No Drawings
[52] U.S. Cl. .................................................. 260/2.5 N,
 260/2.5 D, 260/2.5 A, 260/2.5 AC, 260/47 CB,
 260/65 R, 260/77.5 NC, 260/77.5 AC, 260/78 R,
 260/78 TF, 260/830 P
[51] Int. Cl. .......................................................C08g 47/08,
 C08j 1/14
[50] Field of Search............................................ 260/78 R,
 78 TF, 47 CB, 65 R, 77.5 NE, 2.5

[56] References Cited
 UNITED STATES PATENTS
2,921,915 1/1960 Brochhagen et al. .......... 260/2.5 AC
3,300,420 1/1967 Frey .............................. 260/2.5 AMA
3,310,506 3/1967 Amborski et al. ............ 260/2.5 N

*Primary Examiner*—Murray Tillman
*Assistant Examiner*—Morton Foelak
*Attorneys*—Denis A. Firth and John Kekich ABSTRACT: High temperature resistant cellular polymers are prepared in a one-shot procedure by reacting a polycarboxylic acid or polycarboxylic anhydride with an organic polyisocyanate in the presence of a catalyst combination comprising a tertiary amine, an aliphatic alcohol ($C_1-C_6$), and optionally, a monomeric homocyclic polyepoxide. The use of the latter catalyst system not only increases the rate of foam formation but permits foam formation to be initiated at ambient temperature without the need to supply external heat to the reaction mixture before or after the reactants are brought together. This permits pouring-in-place of the foam forming system, for example, in the insulation of cavity walls for construction purposes, in trailer walls, and in cold storage frameworks and the like.

PREPARATION OF POLYMER FOAM

BACKGROUND OF THE INVENTION

1. Field of the Invention

This invention relates to an improved process for the preparation of high temperature resistant cellular foams and is more particularly concerned with a novel catalytic process for the preparation of high temperature resistant cellular polymers from organic polyisocyanates and polycarboxylic acid derivatives and with the foams so produced.

2. Description of the Prior Art

Methods of preparing cellular polymers from organic polyisocyanates and polycarboxylic acid anhydrides have been described heretofore; see U.S. Pat. No. 3,300,420. In the latter method it has been necessary to bring the components together in the fluid state and to heat the resulting mixture of reactants to a temperature of at least 230° C in order to initiate the formation of the cellular polymer foam.

In a related known method of making a cellular polymer which is a composite of a polyurethane and a polyimide foam, a polycarboxylic acid or anhydride is incorporated into a conventional polyurethane foam producing system, see French Pat. No. 1,461,270 and Certificate of Addition No. 90,033 thereto. In this system the reaction of the polyisocyanate with the polycarboxylic acid derivative and with the polyol employed in the conventional polyurethane foam system proceeds simultaneously. However, it is necessary to subject the resulting mixed polymer foam to high temperature conversion in order to produce a final product having thermal properties approaching those of polyimide foams prepared as described by the above method.

A third alternative method of preparing high-temperature polyimide foams is described, for example, in U.S. Pat. No. 3,310,506, which involves the reaction of a polyisocyanate and a polycarboxylic acid anhydride to form an intermediate polyamide acid under foam producing conditions. The cellular polyamide acid so produced is then heated to complete ring closure with formation of the corresponding polyimide foam. The temperatures required to effect this conversion are those of the same order as employed above in the direct reaction of polyisocyanate and polycarboxylic acid anhydride to form the polyimide foam.

All the above methods of producing polyimide foams possess the serious drawback that they cannot be used to prepare poured-in-place foams. Such foams are those which are prepared by placing the foam-forming reactants within a cavity, such as that within the hollow walls of a trailer truck which is to be insulated with the foam, or within the walls of a cold storage warehouse and the like. The necessity to expose either the reaction mixture or the end product to high temperatures in order to produce the foams in accordance with the above described methods renders such methods useless for pour-in-place applications.

We have now found that the reaction between a polyisocyanate and a polycarboxylic acid derivative can be conducted readily under conditions which do not require any external heat to be supplied to the foam reaction components, before or after they are brought together, or to the end product of the foam reaction after it has been formed. The advantages of being able to effect such an operation in this manner will be obvious to one skilled in the art. The process of the present invention enables polyimide, polyamide or polyimide-polyamide foams to be prepared and employed on a large scale with all the convenience which is enjoyed in the manufacture and use of conventional polyurethane foams.

BRIEF DESCRIPTION OF THE INVENTION

Our invention in its broadest aspect comprises an improved process for the preparation of a high temperature resistant polymer foam by reaction of an organic polyisocyanate and polycarboxylic acid derivative containing at least two carboxylic moieties selected from the class consisting of free carboxylic acid groups and anhydride groups, wherein the improvement comprises carrying out the reaction in a one-shot procedure in the presence of a catalyst combination comprising a tertiary amine and an aliphatic alcohol of from one to six carbon atoms, inclusive.

DETAILED DESCRIPTION OF THE INVENTION

In carrying out the process of the invention, the polyisocyanate and the polycarboxylic derivative, each of which will be defined and exemplified hereinafter, are brought together in a one-shot procedure in the presence of a particular combination of catalyst; namely, a tertiary amine and an aliphatic alcohol of the above-stated carbon atom content. Using this procedure, it is unnecessary to supply any external heat to the reaction mixture either before or after the reactants have been brought together. That is to say, the reactants can be brought together at ambient temperatures, i.e., temperatures at which the components are normally stored prior to use. Ambient temperatures can range from about 0° C. to about 30° C. depending upon the location in which the storage of components and the bringing together of same is carried out.

In carrying out the process of the invention, no special techniques are required. The various components are simply brought together using agitation means sufficient to ensure homogeneity in the resulting mixture. Advantageously, the polyisocyanate and polycarboxylic acid components are mixed together in a preliminary step and the catalyst combination is added to this premix with vigorous agitation. The mixing of the components can be carried out by hand when operating on a small scale but is advantageously carried out using the various mixing and dispensing machines conventionally employed in the manufacture of polymer foams; see, for example, Ferrigno "Rigid Plastic foams," Reinhold Publishing Corporation, New York 1963. Immediately after completion of mixing of the components the foam reaction mix is poured or dispensed directly into the appropriate mold and foaming is allowed to take place in the mold in accordance with procedures well recognized in the art for the molding of polymer foams. The foam-producing reaction is highly exothermic, more so than is the case with most polymer foam forming systems, such as polyurethane foam forming systems hitherto encountered in the art. Accordingly, allowance is made for this high exothermicity in designing the molds employed with the polymer foams of the invention.

As set forth above, the combination of the tertiary amine, and the aliphatic alcohol is employed in catalytic amount, i.e., the amount of each component is less than 1 mole per mole of the polyisocyanate and polycarboxylic acid derivatives. The proportion of tertiary amine employed in the catalyst system is advantageously from about 0.01 equivalent to about 0.2 equivalent per equivalent of polyisocyanate and preferably is from about 0.01 equivalent to about 0.1 equivalent per equivalent of isocyanate. Similarly, the proportion of aliphatic alcohol employed in the catalyst system is advantageously from about 0.01 equivalent to about 0.1 equivalent per equivalent of polyisocyanate and is preferably from about 0.025 equivalents to about 0.075 equivalent per equivalent of polyisocyanate.

The proportion of tertiary amine to aliphatic alcohol in the catalyst combination is not critical provided each of the components in the combination is present in a concentration, based on polyisocyanate, within the limits set forth above. Thus, we have found that the process of the invention cannot be carried out using tertiary amine alone in the absence of aliphatic alcohol. In a preferred embodiment of the process of the invention, the catalyst combination comprises a monomeric polyepoxide as hereinafter defined. When said monomeric polyepoxide is employed, it is advantageously present in the polymer foam reaction mixture in an amount of 0.01 equivalent to about 0.4 equivalent per equivalent of polyisocyanate. Preferably the monomeric polyepoxide, when employed, is present in a proportion of about 0.01 equivalent to about 0.2 equivalent per equivalent of polyisocyanate.

The proportion of polyisocyanate employed in the process of the invention is advantageously at least 0.025 equivalent per equivalent of polycarboxylic acid. The upper limit of the amount of polyisocyanate employed is not critical and is dictated largely by economic factors. A practical upper limit of polyisocyanate is of the order of about 10 equivalents of polyisocyanate per equivalent of polycarboxylic acid. Generally speaking, however, a proportion of about 0.6 to about 2.0 equivalents of polyisocyanate per equivalent of polycarboxylic acid derivative is preferred. Preferably the proportion of polyisocyanate is of the order of one equivalent per 0.1 to 0.5 equivalents of polycarboxylic acid derivative and, most preferably, is of the order of one equivalent per 0.2 to 0.4 equivalents of polycarboxylic acid derivative.

As will be appreciated by one skilled in the art, the product obtained, when the proportions of polyisocyanate and polycarboxylic acid derivative are equivalent, will be substantially exclusively a polyimide or polyamide or mixtures thereof (see hereinafter). When the amount of polycarboxylic acid derivative employed in the process of the invention is less than 1 equivalent per equivalent of polyisocyanate, the product of reaction is a copolymer containing, in addition to recurring imide and/or amide moieties (see hereinafter), moieties corresponding to the polyisocyanurate obtained by trimerization of the excess polyisocyanate. There may also be present in the reaction product polyoxazolidinone moieties derived by reaction between the excess polyisocyanate with polyepoxide when a polyepoxide is employed in the catalyst system. The proportions of such moieties other than polyimide will obviously be greater, the greater the amount of polyisocyanate employed in excess of the stoichiometric proportion.

The term "equivalent" when employed in reference to the polycarboxylic acid derivative corresponds to the acid equivalent weight of the compound, i.e., the molecular weight divided by the number of carboxylic acid groups per molecule or in the case of a polycarboxylic acid intramolecular anhydride, the molecular weight of said anhydride divided by the number of anhydride moieties per molecule.

The polyisocyanate employed in the preparation of the novel cellular polymers of the invention can be any of the polyisocyanates, organic and inorganic, known to be useful in the art of polymer formation. Such polyisocyanates are commonly employed in the preparation of polyurethanes by reaction with compounds containing two or more active hydrogen-containing groups (i.e., groups which show a positive reaction when tested by the Zerewitinoff method, Journal American Chemical Society 49, 3181, 1927).

Illustrative of such polyisocyanates are 2,4-tolylene diisocyanate, 2,6-tolylene diisocyanate, 4,4'-methylenebis-(phenyl isocyanate), dianisidine diisocyanate, tolidine diisocyanate, hexamethylene diisocyanate, m-xylene diisocyanate, 1,5-naphthalene diisocyanate, p-phenylene diisocyanate, 1,4-diethylbenzene-$\beta\beta'$-diisocyanate and other di- and higher polyisocyanates such as those listed in the tables of Siefken, Ann. 562, 122–135 (1949). Mixtures of two or more of the above isocyanates can be used, such as mixtures of the 2,4- and 2,6-isomers of tolylene diisocyanate, mixtures of the 2,4'- and 4,4'-isomer of methylenebis (phenyl isocyanate) and the like. In addition to the 4,4'-methylenebis(phenyl isocyanate) or mixtures of the 2,4'-isomer and 4,4'-isomer thereof which are employed as the isocyanate component, there can also be used modified forms of these isocyanates. For example, there can be used 4,4'-methylenebis (phenyl isocyanate), or an admixture thereof with a minor amount of the 2,4'-isomer, which has been treated to convert a minor proportion, generally less than 15 percent by weight of the starting material, to an artefact of said starting material. For example, the polyisocyanate component can be methylenebis(phenyl isocyanate) which has been converted to a stable liquid at temperatures of about 15° C. and higher using, for example, the processes described in Belgian Pat. No. 678,773.

Illustrative of another modified form of 4,4'-methylenebis(phenyl isocyanate) which can form the polyisocyanate component is the product obtained by treating the former compound, or mixtures thereof with small portions of 2,4'-isomer, with a minor portion of a carbodiimide such as diphenylcarbodiimide in accordance, for example, with the procedure described in British Pat. No. 918,454. In accordance with said process, a minor proportion of the methylenebis(phenyl isocyanate) isocyanate) is converted to the corresponding isocyanato-carbodiimide and there is obtained a mixture of a major proportion of unchanged starting material and a minor proportion of said isocyanato-substituted carbodiimide.

In addition to the various modified forms of methylenebis(phenyl isocyanate) exemplified above, there can also be employed as the polyisocyanate component a mixture of methylenebis(phenyl isocyanate) with polymethylene polyphenyl isocyanates of higher functionality. Such mixtures are generally those obtained by phosgenation of corresponding mixtures of methylene bridged polyphenyl polyamines. The latter, in turn, are obtained by interaction of formaldehyde, hydrochloric acid and primary aromatic amines, for example, aniline, o-chloroaniline, o-toluidine and the like. Such polyamines, and polyisocyanates prepared therefrom, are known in the art, see, for example, U.S. Pat. No. 2,683,730; 2,950,263; 3,012,088; and 3,097,191; Canadian Pat. No. 665,495; and German Pat. No. 1,131,877. The preferred polyisocyanates are methylenebis(phenyl isocyanates) and the modified forms thereof including mixtures of polymethylene polyphenyl isocyanates containing from about 35 percent by weight to about 85 percent by weight of methylenebis(phenyl isocyanate). The most preferred polyisocyanate is a polymethylene polyphenyl isocyanate mixture containing from about 35 percent by weight to about 60 percent by weight of methylenebis(phenyl isocyanate), the remainder of said mixture being polymethylene polyphenyl isocyanates having a functionality greater than 2.0.

The polycarboxylic derivative employed in the process of the invention contains at least two carboxylic moieties selected from the class consisting of free carboxy groups and anhydride groups. Said polycarboxylic derivatives are inclusive of aromatic, aliphatic, cycloaliphatic or heterocyclic polycarboxylic acids as well as the intramolecular and/or intermolecular anhydrides thereof, provided that, in the case of those anhydrides which contain a single anhydride group there is also present in the molecule at least one free carboxy group. As will be appreciated by one skilled in the art, only those polycarboxylic acids which contain carboxy groups attached either to two adjacent carbon atoms or to two carbon atoms which are separated from each other by a single carbon or heteroatom are capable of forming intra as opposed to intermolecular acid anhydrides.

Any of the aforesaid polycarboxylic acids or anhydrides can be employed as the polycarboxylic derivative in the process of the invention. As will be apparent to the skilled chemist, the nature of the recurring units in the resulting polymers will vary according to the structure of the starting polycarboxylic derivative.

When the polycarboxylic acid derivative is a dicarboxylic acid which is incapable of forming an intramolecular anhydride, the product formed in accordance with the process of the invention is essentially a polyamide, e.g., the product from said dicarboxylic acid and a diisocyanate would contain the recurring unit:

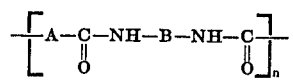

wherein A is the hydrocarbon residue of the dicarboxylic acid starting material and B is the hydrocarbon residue of the diisocyanate. On the other hand, when the polycarboxylic derivative is an intramolecular or intermolecular anhydride which contains two or more anhydride moieties or contains one anhydride moiety and free carboxylic acid groups capable of intramolecular or intermolecular anhydride formation, the product of reaction in accordance with the process of the invention is essentially a polyimide, e.g., the product of reaction of a diisocyanate and a polycarboxylic acid derivative containing two intramolecular anhydride groups would contain the recurring unit:

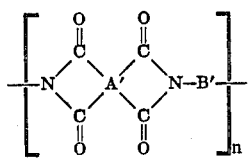

wherein A' is the hydrocarbon residue of the dianhydride and B' is the hydrocarbon residue of the diisocyanate.

Similarly where the polycarboxylic acid derivative contains one or more anhydride groups in addition to the free carboxylic acid group or groups, the polymer resulting from the process of the invention will be essentially a hydrid containing both amide and imide linkages.

All of the above types of polymers can be prepared in accordance with the novel process hereinabove described and all fall within the scope of this invention. This, by appropriate choice of the polycarboxylic acid derivative, it is possible to prepare any of a wide variety of polymers using the single step process of the invention.

Examples of polycarboxylic derivatives which can be employed as the free carboxylic acids or as intermolecular anhydrides formed from the same or different acids are: isophthalic acid, terephthalic acid, trimesic acid and phthalic acid. Examples of polycarboxylic derivatives which can be employed as the free carboxylic acids or intramolecular anhydrides thereof, are:

trimellitic acid and the anhydride thereof, pyromellitic acid and the dianhydride thereof, mellophanic acid and the anhydride thereof,
benzene-1,2,3,4-tetracarboxylic acid and the dianhydride thereof,
benzene-1,2,3-tricarboxylic acid and the anhydride thereof,
diphenyl-3,3 ', 4,4 '-tetracarboxylic acid and the dianhydride thereof,
diphenyl-2,2 ', 3,3'-tetracarboxylic acid and the dianhydride thereof,
naphthalene-2,3,6,7-tetracarboxylic acid and the dianhydride thereof,
naphthalene-1,2,4,5-tetracarboxylic acid and the dianhydride thereof,
naphthalene-1,4,5,8-tetracarboxylic acid and the dianhydride thereof,
decahydronaphthalene-1,4,5,8-tetracarboxylic acid and the dianhydride thereof,
4,8-dimethyl-1,2,3,5,6, 7-hexahydronaphthalene-1,2,5,6-tetracarboxylic acid and the dianhydride thereof,
2,6-dichloronaphthalene-1,4,5,8-tetracarboxylic acid and the dianhydride thereof,
2,7-dichloronaphthalene-1,4,5,8-tetracarboxylic acid and the dianhydride thereof,
2,3,6,7-tetrachloronaphthalene-1,4,5,8-tetracarboxylic acid and the dianhydride thereof,
phenanthrene-1,3,9,10-tetracarboxylic acid and the dianhydride thereof,
perylene-3,4,9,10-tetracarboxylic acid and the dianhydride thereof,
bis(2,3-dicarboxyphenyl) methane and the dianhydride thereof,
bis(3,4-dicarboxyphenyl) methane and the dianhydride thereof,
1,1-bis(2,3-dicarboxyphenyl) ethane and the dianhydride thereof,
1,1-bis(3,4-dicarboxyphenyl)ethane and the dianhydride thereof,
2,2-bis(2,3-dicarboxyphenyl) propane and the dianhydride thereof,
2,3-bis(3,4-dicarboxyphenyl) propane and the dianhydride thereof,
bis(3,4-dicarboxyphenyl) sulfone and the dianhydride thereof,
bis(3,4-dicarboxyphenyl)ether and the dianhydride thereof,
ethylene tetracarboxylic acid and the dianhydride thereof,
butane-1,2,3,4-tetracarboxylic acid and the dianhydride thereof,
cyclopentane-1,2,3,4--tetracarboxylic acid and the dianhydride thereof,
pyrrolidine-2,3,4,5-tetracarboxylic acid and the dianhydride thereof,
pyrazine-2,3,5,6-tetracarboxylic acid and the dianhydride thereof,
mellitic acid and the trianhydride thereof,
thiophen-2,3,4,5-tetracarboxylic acid and the dianhydride thereof, and
benzophenone-3,3 ', 4,4'-tetracarboxylic acid and the dianhydride thereof.

Other anhydrides which may be employed in the practice of glycol bis-anhydro invention are: the intermolecular anhydride of trimellitic acid 1,2-anhydride (see, for example U.S. Pat. No. 3,155,687); the bisanhydrides disclosed in U.S. No. 3,277,117 [e.g. 4,4'-ethylene glycol bis-anhydro trimellitate and 4,4'-(2-acetyl- 1,3-glycerol)bis-anhydro trimellitate]; and the diadducts of maleic acid or anhydride with styrene.

While any of the polycarboxylic acids and intramolecular or intermolecular anhydrides thereof defined and exemplified above can be employed in the preparation of the polymers of the invention, a preferred group of compounds for this purpose are intramolecular anhydrides which are derived from polycarboxylic acids having at least three carboxyl groups of which at least two carboxyl groups are attached directly to an aromatic nucleus in orthoposition with respect to each other. A particularly preferred group of polycarboxylic acid intramolecular anhydrides are those selected from the class consisting of anhydrides having the following formulae:

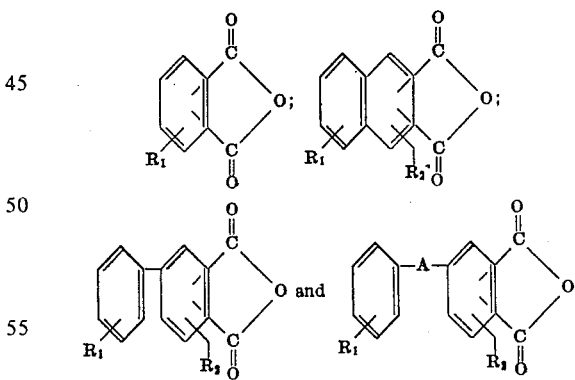

wherein at least one of $R_1$ and $R_2$ represents a group selected from the class consisting of carboxyl and the group

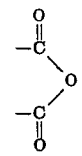

wherein the carbon atoms of the latter are each attached to adjacent carbon atoms in an aromatic ring, and wherein $R_1$ and $R_2$ additionally represent from zero to three substituents selected from the group consisting of halogen and lower-alkyl and A is a bridging group selected from the class consisting of lower-alkylene, carbonyl, sulfonyl and oxygen.

The term "lower-alkyl" means alkyl containing from one to six carbon atoms, inclusive, such as methyl, ethyl, propyl butyl, pentyl, hexyl, and isomeric forms thereof. The term "-halogen" means fluorine, chlorine, bromine, and iodine. The term "lower-alkylene" means alkylene containing from one to six carbon atoms, inclusive, such as methylene, ethylene, 1,3-propylene, 1,4-butylene, 2,3-butylene, 1,6-hexylene and the like.

The monomeric polyepoxide optionally employed in the catalyst system in the preparation of the novel cellular polymers of the invention can be any monomeric compound containing two or more epoxide

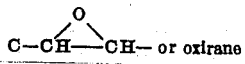

groups. The preferred polyepoxides used in preparing the cellular polymers of the invention are monomeric homocyclic polyepoxides.

Such epoxides are characterized by the presence of at least two epoxy groups each of which is present in a substituent attached to a cyclic hydrocarbon compound or is fused to a nonaromatic ring in a cyclic hydrocarbon compound. Examples of monomeric homocyclic polyepoxides are:

1. the glycidyl ethers of polyhydric mononuclear and fused ring phenols such as resorcinol, hydroquinone, pyrocatechol, saligenin, phloroglucinol, 1,5-dihydroxynaphthalene, 1,6-dihydroxynaphthalene, 1,7-dihydroxynaphthalene and the like;
2. the glycidyl ethers of nonfused polynuclear phenols represented by the general formula:

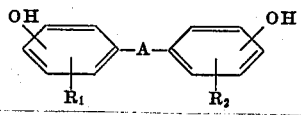

wherein $R_1$ represents from zero to four substituents selected from the class consisting of halogen and lower-alkyl, A is a bridging group selected from the class consisting of

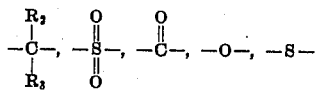

and a single covalent bond wherein $R_2$ and $R_3$ each represent a moiety selected from the class consisting of hydrogen, lower-alkyl, lower-cycloalkyl and aryl. Illustrative of such compounds are the bis(glycidyl ethers) of:
4,4'-dihydroxydiphenylsulfone,
4,4'-dihydroxybiphenyl,
4,4'-dihydroxybenzophenone, di(4-hydroxyphenyl)methane (bisphenol F),
2,2-di(4-hydroxyphenyl)butane (bisphenol B),
2,2-di(4-hydroxyphenyl)propane (bisphenol A),
1,1-di(4-hydroxyphenyl) propane,
3,3-di(3-hydroxyphenyl) pentane,
2-(3-hydroxyphenyl)-2-(4-hydroxyphenyl)butane,
1-phenyl-1-(2-hydroxyphenyl) -1-(3-hydroxyphenyl)-propane,
1-phenyl-1,1-di(4 -hydroxyphenyl)butane,
1-phenyl-1,1 -di(4-hydroxyphenyl)pentane,
1-tolyl-1, 1-di(4 hydroxyphenyl)ethane,
bis(3-bromo-4-hydroxyphenyl)methane,
2,2-bis(3-bromo-4-hydroxyphenyl)propane,
bis (3-bromo-4-hydroxyphenyl)diphenylmethane,
1,1-bis(3-bromo-4-hydroxyphenyl)-1-(2,5-dibromophenyl ethane,
2,2-bis(3-bromo-4-hydroxyphenyl)propionitrile,
bis(3,5-dibromo-4-hydroxyphenyl)methane,
2,2-bis(3,5-dibromo-4-hydroxyphenyl)propane,
bis (3,5-dibromo-4-hydroxyphenyl)methane,
1,1-bis(3,5-dibromo-4-hydroxyphenyl)-1-(2,5-dibromophenyl)ethane,
bis (3-bromo-4-hydroxyphenyl)sulfone,
bis (3,5-dibromo-4-hydroxyphenyl)sulfone,
3. the glycidyl ethers of novolac resins. The novolac resins are the product obtained by acid condensation of of phenol, or a substituted phenol, with formaldehyde and are conventionally represented by the general formula:

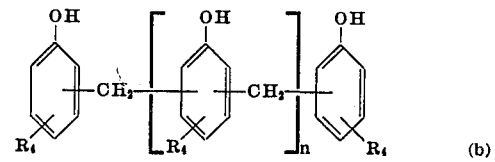

wherein $n$ has an average value of from about eight to 12 and $R_4$ represents from zero to four substituents selected from halogen and lower-alkyl groups. It is to be understood that the above formula is highly idealized and is an approximation only; see, for example, Carswell, "Phenoplasts,"pages 29 –35, Interscience, New York, 1947. A wide range of novolac resins of differing molecular weights is available commercially, all of which are represented approximately by the above formula. Since the class of novolac resins is so well recognized in the art, the epoxides derived therefrom by conversion of the novolacs to their glycidyl ethers (by conventional procedures, e.g., reaction with epichlorohydrin) will be referred to hereafter as "novolac resin glycidyl ethers";

4. dicyclopentadiene dioxide, i.e., the compound having the formula:

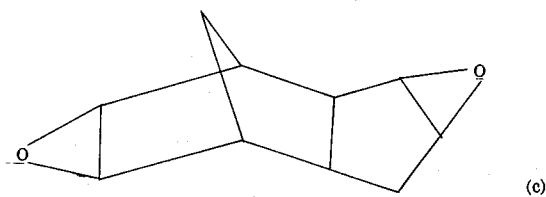

5. vinyl cyclohexene dioxide, i.e., the compound having the formula:

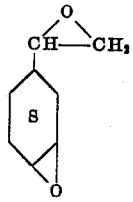

6. the dicyclohexyl oxide carboxylates represented by the general formula:

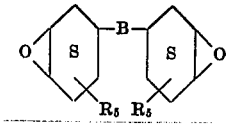

wherein $R_5$ in each instance represents from zero to nine lower-alkyl groups, and B represents a divalent radical selected from the class consisting of:

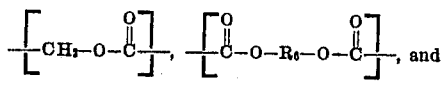

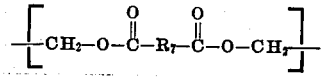

wherein $R_6$ is selected from the class consisting of lower-alkylene and lower-oxyalkylene and $R_7$ is selected from the class consisting of lower-alkylene and arylene. Examples of the dicyclohexyl oxide carboxylates are:

3,4-epoxycyclohexylmethyl 3,4-epoxycyclohexane-carboxylate,
3,4-epoxy-6-methylcyclohexylmethyl 3,4-epoxy-6-methylcyclopexylcarboxylate,
bis(3,4-epoxycyclohexylmethyl)maleate,
bis(3,4-epoxycyclohexylmethyl)succinate,
ethylene glycol bis(3,4-epoxycyclohexanecarboxylate),
2-ethyl-1,3-hexanediol bis(3,4-epoxy-6-methylcyclo-hexanecarboxylate and the like.

7. the glycidyl derivatives of aromatic primary amines represented by the formula:

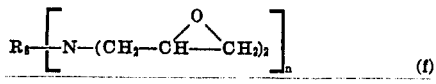

(f)

wherein $n$ is an integer from one to three and $R_8$ is an aromatic residue of valency $n$ selected from the class consisting of aromatic residues having the formulae:

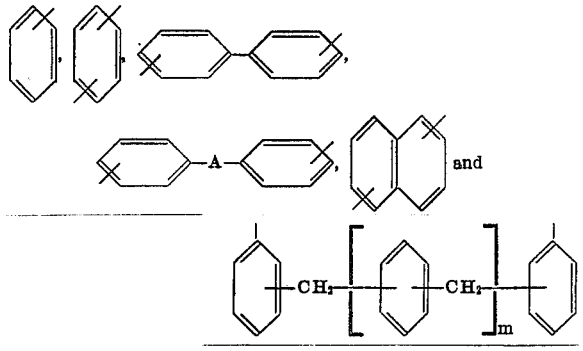

wherein A is a bridging group as hereinbefore defined and $m$ is a number having an average value of from about 0.1 to about 1.0. Illustrative of such compounds are the N,N-diglycidyl derivatives of:
aniline,
2,4-tolylene diamine,
2,6-tolylene diamine,
m-phenylene diamine,
p-phenylene diamine,
4,4'-diamino-diphenyl,
4,4'-diamin-diphenyl methane,
2,2-di(4-aminophenyl)propane,
2,2-di(4-aminophenyl)butane,
4,4'-diamino-diphenyl sulfide,
4,4'-diamino-diphenyl sulfone, 4,4'-diaminodiphenyl ether, 1,5-diamine-napthalene and
methylene-bridged polyphenyl polyamines from about 35 percent by weight to about 85 percent by weight of methylenedianilines, the remaining parts of said mixture being triamines and polyamines of higher molecular weight, said polyamine mixture having been formed by acid condensation of aniline and formaldehyde. The latter polyamine mixtures can be prepared by procedures well-known in the art; see, for example, British Pat. No. 1,042,220.

The term "lower-cycloalkyl" as used through this specification and the claims thereof means cycloalkyl from four to eight carbon atoms such as cyclobutyl, cyclopentyl, cyclohexyl, cycloheptyl, and cyclooctyl. The term "lower-oxyalkylene" means lower-alkylene, as defined above, interrupted by the radical —O—. The term "arylene" means a bivalent radical, such as phenylene, tolylene, xylylene, biphenylylene and the like, derived from an aromatic hydrocarbon by removal of a hydrogen atom from each of two carbon atoms of the nucleus. The term "aryl" means the moiety obtained by removing one hydrogen atom from an aromatic hydrocarbon of from six to 12 carbon atoms, inclusive. Illustrative of aryl moieties are phenyl, tolyl, xylyl, biphenylyl, naphthyl and the like.

The monomeric homocyclic polyepoxides described and exemplified hereinabove are, for the most part, well-known in the art and can be prepared by methods well-known in the art; see, for example, Lee and Neville, "Epoxy Resins", McGraw-Hill Book Company, New York (1957), U.S. Pat. Nos. 2,663,458; 2,716,123; 2,745,847; 2,745,285; 2,872,427; 2,884,408; 2,902,518; 2,921,037; 3,312,664; 3,268,619; 3,325,452; and British Pat. No. 614,235.

While any of the monomeric homocyclic polyepoxide compounds exemplified hereinabove can be used in the preparation of the high-temperature resistant polymers of the invention, the preferred compounds for this purpose are those of the groups 2, 3, and 7 set forth above, namely, the glycidyl ethers of nonfused polynuclear phenols represented by the formula (a) above, the novolac resin glycidyl ethers represented by formula (b) above, and the glycidyl derivatives of the primary aromatic amines represented by the formula (f) above. The use of epoxides of these classes gives rise to cellular polymers of the invention which possess the highest resistance to deformation by heat and the lowest flame spread rating of the cellular polymers of this class.

Within this particular group of polyepoxides we have found that those which are derived from phenols of the formula (b) above are the most preferred since they give rise to cellular polymers having the highest resistance to flame spread and heat deformation.

The tertiary amines which are employed in the catalyst system in accordance with the process of the invention are those which are more usually employed to catalyze the reaction between an isocyanato group and an active hydrogen atom. Such catalysts are a group of compounds well-recognized in the art of synthesizing polyurethanes; see, for example, Saunders et al. Polyurethanes, Chemistry and Technology, Part I, pages 228–230, Interscience Publishers, New York, 1964, see also Burkus, J., Journal of Organic Chemistry, 26, pages 779–782, 1961.

Representative of said tertiary amine catalysts are: N,N-dialkylpiperazines such as N,N-dimethylpiperazine, N,N-diethylpiperazine and the like; trialkylamines such as trimethylamine, triethylamine, tributylamine and the like:: 1,4-diazabicyclo [2·2·2] octane, which is more frequently referred to as triethylene diamine, and the lower-alkyl derivatives thereof such as 2-methyl triethylene diamine, 2,3-dimethyl triethylene diamine, 2,5-diethyl triethylene diamine and 2,6-diisopropyl triethylene diamine; N,N', N''-trialkylaminoalkylhexahydrotriazines such as N,N', N''-tris-(dimethylaminomethyl)-hexahydrotriazine, N,N',N''-tris (dimethylaminoethyl)hexahydrotriazine, N,N',N''-tris(dimethyl-aminopropyl)hexahydrotriazine, N,N',N''-tris(diethylamino-ethyl)hexahydrotriazine, N,N',N''-tris (diethylaminopropyl)-hexahydrotriazine and the like; mono-, di-, and tri-(dialkyl-aminoalkyl) monohydric phenols or thiophenols such as 2-(dimehtylaminoethyl)phenol, 2-(dimethylaminobutyl)phenol, 2-(diethylaminoethyl)phenol, 2-(diethylaminobutyl)phenol, 2-(dimethylaminomethyl)thiophenol, 2-(diethylaminoethyl)-thiophenyl, 2,4-bis(dimethylaminoethyl)phenol, 2,4-bis-(diethylaminobutyl)phenol, 2,4-bis(dipropylaminoethyl)phenol, 2,4-bis(dimethylaminoethyl)thiophenol, 2,4-bis(diethylaminopropyl)thiophenol, 2,4-bis(dipropylaminoethyl)thiophenol, 2,4,6-tris(dimethylaminoethyl)phenol, 2,4,6-tris(diethylaminoethyl)phenol, 2,4,6-tris(dimethylaminobutyl)phenol, 2,4,6-tris-dipropylaminomethyl)phenol, 2,4,6-tris(diethyl-aminoethyl)thiophenol, 2,4,6-tris(dimethylaminoethyl)thiophenol and the like; N,N,N',N'-tetraalkylalkylenediamines such as N,N,N',N'-tetramethyl-1,3-propane diamine, N,N,N',N'-tetramethyl-1,3-butinediamine, N,N,N',N'-tetramethylethylene-diamine and the like; N,N-dialkylcyclohexylamines such as N,N-dimethylcyclohexylamine, N,N-diethylcyclohexylamine and the like; N-alkylmorpholines such as N-methylmorpholine, N-ethylmorpholine and the like; N,N-dialkylalkanolamines such as N,N-dimethylethanolamine, N,N-diethylethanolamine and the like; N,N,N–,N'-tetraalkylguanidines such as N,N,N',N'-methylquanidine, N,N,N',N'-tetraethylguanidine and the like.

The preferred tertiary amine catalysts for use in preparing the polymers of the invention are the triethylene diamines, the N,N',N"tris(dialkylaminoalkyl)hexahydrotriazines, the mono(dialkylaminoalkyl)phenols, and the 2,4,6-tris(dialkylaminoalkyl)phenols. These preferred tertiary amine catalysts can be employed singly or in combination of two or more such amines. A particularly preferred combination of tertiary amines to be used in conjunction with an epoxide in accordance with the invention, is a mixture of triethylene diamine and an N,N',N"-tris(dialkylaminoalkyl)-hexahydrotiazine. The mixture is advantageously preblended and employed in liquid form thereby overcoming the usual difficulty of employing triethylenediamine which is a solid at ordinary temperatures.

The aliphatic alcohols which are employed in the catalyst combination in accordance with the process of the invention are monohydric and dihydric saturated aliphatic alcohols having a carbon atom content within the stated limits. Illustrative of monohydric aliphatic alcohols meeting the stated carbon atom limitation are methanol, ethanol, propanol, butanol, pentanol, and hexanol including the various isomeric forms of these alcohols. Illustrative of dihydric aliphatic alcohols meeting the stated carbon atom limitation are ethylene glycol, 1,2-propanediol, 1,3-propanediol, 1,4-butanediol, 2,3-pentanediol, 1,3-hexanediol and the like. The preferred aliphatic alcohol for use in the process of the invention is methanol.

Illustrative of said extraneously added foaming agents are water (which generates carbon dioxide by reaction with isocyanate) and volatile solvents such as the lower molecular weight aliphatic hydrocarbons, namely those having boiling points of from about $-40°$ C. to about $200°$ C., preferably from about $-20°$ C. to about $115°$ C., for example difluorochloromethane, trichloromonofluoromethane, dichlorodifluoromethane, chlorotrifluoromethane, 1,1-dichloro-1-fluoroethane, 1-chloro-1,1-difluoro-2,2-dichloroethane, and 1,1,1-tribromo-2-chloro-2-fluorobutane, and the like. If desired, a mixture of water and one or more of said volatile solvents can be used as a foaming agent.

Other optional additives such as dispersing agents, cell stabilizers, surfactants, flame retardants, and the like which are commonly employed in the fabrication of polymer foams, can be employed in the process of the invention. Thus a finer cell structure may be obtained if water-soluble organosilicone polymers are used as surfactants in the reaction mix. Organosilicone polymers obtained by condensing a polyalkoxy polysilane with the monoether of a polyalkylene gylcol in the presence of an acid catalyst are representative of those surfactants which can be used for this purpose. Other surfactants such as ethylene oxide modified sorbitan monopalmitate or ethylene oxide modified polypropylene-ether glycol may be used, if desired, to obtain better dispersion of the components of the foam mixture.

Additives such as dyes, pigments, soaps and metallic powders and other inert fillers may be added to the foam mixture to obtain special foam properties in accordance with practices well-known in the art.

The polymers of this invention possess outstanding high-temperature and flame-resistant properties. The cellular polymers of the invention have decomposition temperatures in excess of $500°$ C. as measured by thermal gravimetric analysis (TGA) and very low flame spread ratings. It is to be noted that these high-temperature resistant properties and low-flame spread ratings have been achieved in the cellular polymers of the invention without recourse to the flame retardants which have hitherto been incorporated into cellular polymers to achieve flame-retardant properties. The introduction of such flame retardants is highly undesirable because they tend to reduce the structural strength and like properties of the foam.

Accordingly, the process and compositions of the invention represent a unique advance in foam technology. In particular the invention provides cellular polymers based on polyisocyanates which have sufficiently low-flame spread ratings, as measured by the ASTM F 84 –61 flame test, to permit the use of such polymers in the construction of domestic and industrial buildings.

The cellular products of the invention can be employed for all the purposes for which the currently produced commercial cellular products are conventionally employed. For example, the cellular products of the invention can be employed as thermal barriers in the construction of firewalls in the building of industrial and institutional structures (e.g., schools, hospitals, etc.) and as insulating materials for high-temperature pipelines and ovens, in supersonic aircraft and also as missile components. As previously pointed out, the novel process of the invention enables cellular products of the above type to be poured-in-place and thereby provides a very significant advantage over previous methods described for the preparation of polyimide and like foams. Thus the process of the invention does not require the application of external heat in order to effect the polymer formation nor does it require the heating of molds, cavity walls, and the like, to high temperatures.

The following examples describe the manner and process of making and using the invention and set forth the best mode contemplated by the inventors of carrying out the invention but are not to be construed as limiting. All parts are by weight unless otherwise stated.

EXAMPLE 1

A foam (foam A) was prepared in accordance with the invention using the following procedure.

A mixture of 134 parts by weight (1.0 equivalent) of polymethylene polyphenyl polyisocyanate (PAPI; equivalent weight=134), 45 parts by weight (0.279 equivalent) of 3,3',4,4'-benzophenone tetracarboxylic acid dianhydride, 20 parts by weight (0.116 equivalent) of epoxy novolac resin (Epon 152; equivalent weight =172) and 1 part of organosilicone surfactant (DC–193) was blended at circa $25°$ C. using high-speed mechanical stirring. A second mixture, composed of 2 parts by weight of triethylenediamine, 4 parts by weight of N,N',N"tris(dimethylaminopropyl)-s-hexahydrotriazine and 4 parts of methanol, was prepared separately by blending the components at circa $25°$ C. using high-speed mechanical stirring. The two mixtures so obtained were then admixed and subjected to high-speed mechanical stirring for 20 seconds before being poured into an open paper cup mold. The temperature of the mixture was measured by means of a thermocouple immersed in the foam mixture and connected to an appropriate recording device. Initiation of reaction (as detected by color change of material) was observed to have occurred before mixing was complete, and foam rise began 30 seconds after mixing began. The foam temperature data measured as described above is recorded in table I below.

For purposes of comparison, a second foam (Foam B) (not falling within the scope of this invention) was prepared under exactly the same conditions described above except that the catalyst system in the above described foam formulation was replaced by one which lacked the presence of any aliphatic alcohol. Thus, in place of the mixture of 4 parts of methanol, 4 parts of N,N',N"-tris-(dimethylaminopropyl)-s-hexahydrotriazine and 2 parts of triethylene diamine there was employed a mixture of 2 parts of triethylene diamine and 9 parts of a mixture of o- and p-dimethylaminomethylphenol. It was found that, in order to get satisfactory foam formation with this catalyst system, it was necessary to heat all the components to approximately $50°$ C. prior to mixing. Under these conditions it was found that initiation of reaction did not take place until 2 minutes and 30 seconds after mixing and foam rise was not complete until 4 minutes after mixing. The internal temperature of the foam mix was recorded, as in the case of the foam A, and the date obtained thereby is shown in table I below for comparison purposes. It will be seen from the comparative data that exotherm in the foam (foam A) prepared in accordance with the process of the invention, occurred markedly sooner and was markedly greater in magnitude than the exotherm in the second foam (foam B), indicating superiority of the catalyst system employed in foam A.

TABLE I

| Time (after mix) | | Foam Mixture Temperature (°C.) | |
|---|---|---|---|
| Min. | Seconds | Foam A | Foam B |
| — | 30 | 60 | 60 |
| — | 40 | — | 64 |
| — | 50 | — | 65 |
| 1 | 00 | 120 | 66 |
| 1 | 10 | 142 | 66 |
| 1 | 20 | 162 | 67 |
| 1 | 30 | — | — |
| 1 | 40 | 202 | 69 |
| 1 | 50 | — | — |
| 2 | 00 | 210 | 72 |
| 2 | 10 | — | — |
| 2 | 20 | 222 | 76 |
| 2 | 30 | 226 | 78 |
| 2 | 40 | 230 | 82 |
| 2 | 50 | 232 | 90 |
| 3 | 00 | 236 | 125 |
| 3 | 15 | 239 | 160 |
| 3 | 30 | 242 | 190 |
| 3 | 45 | 244 | 200 |
| 4 | 00 | 245 | 208 |
| 4 | 15 | 248 | 212 |
| 4 | 30 | — | 216 |
| 4 | 45 | — | — |
| 5 | 00 | 248 | 221 |
| 6 | 00 | 250 | 227 |
| 7 | 00 | 249 | — |
| 8 | 00 | — | 222 |

EXAMPLE 2

A series of foams was prepared using the procedure described in example 1, foam A and employing the ingredients and proportions set forth in table II below. The table also records the density of each of the polyimide foams so obtained.

TABLE II

| Foam | C | D | E | F | G | H | I |
|---|---|---|---|---|---|---|---|
| Polymethylene polyphenyl polyisocyanate | 134 | 134 | 134 | 134 | 134 | 134 | 134 |
| BTDA [1] | 45 | 45 | 45 | 45 | 45 | 45 | 45 |
| Epoxy novolac resin [2] | 20 | 20 | 20 | 20 | 20 | 20 | 20 |
| Organosilicone surfactant [3] | 1 | 1 | 1 | 1 | 1 | 1 | 1 |
| Methanol | 2 | 2 | 2 | 6 | 4 | 4 | 4 |
| Trimethylene diamine | 2 | 2 | 2 | 2 | 1 | 2 | 2 |
| HHT [4] | 2 | 2 | 4 | 4 | 4 | 2 | 6 |
| Density, p.c.f. | 3.73 | 3.15 | 4.2 | 1.7 | 2.1 | 1.9 | 3.3 |

[1] 3,3′,4,4′-benzophenone tetracarboxylic acid dianhydride.
[2] Epon 152.
[3] DC-193.
[4] N,N′,N″-tris(dimethylaminopropyl)-s-hexahydrotriazine.

Each of the foams so obtained was observed to have fine, uniform cell structure. Foam C was chosen as typical of these foams and was submitted to a number of tests, as follows, all of which demonstrated its high structural strength and resistance to heat and flame spread.

A sample of foam C was maintained at a temperature of 500° F. for 7 days and found to retain 87 percent of its original weight and to show no gross change in appearance or integrity of cell structure. A sample of foam C was found to have a smoke density rating of 22 when tested under standard conditions in a Rohm and Haas Smoke Density Test Chamber. Finally, a sample of foam C was found to have a flame spread rating of 34 when subjected to testing using a miniature form of the ASTM E 84 -61 Tunnel Test. Based on observations over a long period of time, a rating of 34 in the miniature test corresponds to a rating of 0 to 10 in the official ASTM E 84 -61 test.

EXAMPLE 3

Two foams were prepared using the procedure described in example 1, foam A and employing the ingredients and proportions set forth in table III below. After curing at circa 25° C. for 4 days, the resulting foams were submitted to a series of tests, recorded in table III, which indicate the high resistance of the foams to heat and flame spread.

TABLE III

| | Foam J | Foam K |
|---|---|---|
| Polymethylene polyphenyl polyisocyanate | 134 | 134 |
| Trimellitic anhydride | 26 | 26 |
| BTDA [1] | — | 45 |
| Epoxy novolac resin [2] | 20 | 20 |
| Organosilicone surfactant [3] | 2 | 1 |
| Methanol | 2 | 4 |
| Trimethylene diamine | 2 | 2 |
| HHT [4] | 4 | 4 |
| Density: pcf | 1.79 | 2.34 |
| Flame spread [5] (miniature ASTM E 84–61) | 43 | 35 |
| Flame resistance [6] | 0.017 g. 25 sec. | 0.013 g. 26 sec. |

[1] 3,3′,4,4′-benzophenone tetracraboxylic acid dianhydride
[2] Epon 152
[3] DC-193
[4] N,N′,N″-tris(dimethylaminopropyl)-s-hexahydrotriazine
[5] Comparable ratings in the ASTM E 84–61 full scale test would 0–10 for these foams
[6] Test performed as follows:

Four to six samples of foam are cut to dimensions of 0.5 × 1.5 × (5-8) inches. In turn, each sample is suspended vertically in a test chamber so that one end makes contact with a heat coil which generates a temperature of 930–970 °F at a distance of 1/4 inch above its surface. The time interval between ignition, and extinguishing of the flame is measured for each sample; weight loss in the operation is also measured. The results are averaged for all specimens tested and the flame resistance is expressed as average weight loss (grams) per average time to extinguish (seconds).

EXAMPLE 4

A series of foams was prepared using the procedure described in example 1, foam A and employing the ingredients and proportions set forth in table IV below. After curing at circa 25° C. for 4 days the resulting foams were submitted to a series of tests recorded in table IV which indicate the high resistance of the foams to heat and flame spread.

TABLE IV

| Foam | L | M | N | O |
|---|---|---|---|---|
| Polymethylene polyphenyl polyisocyanate | 134 | 134 | 134 | 134 |
| BTDA [1] | 45 | 45 | 45 | 45 |
| Epoxy novolac resin [2] | 20 | 10 | 5 | — |
| Epoxy resin [3] | — | — | — | 10 |
| Organosilicone surfactant [4] | 1 | 1 | 1 | 1 |
| Methanol | 4 | 4 | 4 | 4 |
| Trimethylene diamine | 2 | 2 | 2 | 2 |
| HHT [5] | 2 | 4 | 4 | 4 |
| Density, p.c.f. | 2.24 | 2.88 | 2.40 | 1.66 |
| Compression strength (ASTM D 1621-64), p.s.i.: | | | | |
| Parallel to rise | 20.5 | 28.9 | 20.0 | 13.4 |
| Perpendicular to rise | 10.3 | 12.7 | 8.5 | 6.0 |
| Flame spread [6] (miniature ASTM E 84-61) | 30 | 30 | 30 | 30 |
| Flame resistance [7], g./sec. | 0.013/27 | 0.012/33 | 0.012/27 | 0.13/18 |

[1] 3,3′,4,4′-benzophenone tetracarboxylic acid dianhydride.
[2] Epon 152.
[3] ERE 1359 = Resorcinol diglycidyl ether.
[4] DC-193.
[5] N,N′,N″-tris(dimethylaminopropyl)-s-hexahydrotriazone.
[6] Comparable rating in full scale ASTM E 84-61 would be 0 for both foams.
[7] See Table III, footnote 6.

EXAMPLE 5

A foam (foam P) was prepared using the procedure described for foam A (example 1) and using the ingredients and proportions set forth below:

| | |
|---|---|
| Polymethylene polyphenyl polyisocyanate | 134 |
| BTDA[1] | 45 |
| Epoxy novolac resin[2] | 20 |
| Organosilicone surfactant[3] | 1 |
| Trimethylene diamine | 2 |
| Methanol | 4 |
| HHT[4] | 4 |
| Tetrachlorodifluoroethane | 5 |

[1]3,3′,4,4′-benzophenone tetracarboxylic acid dianhydride
[2]Epon 152
[3]DC-193
[4]N,N′,N″-tris(dimethylaminopropyl)-s-hexahydrotriazine p.c.f., The resulting foam had a density of 2.6 p.c.f., a K-factor of 0.213 and was a uniform fine-celled foam of excellent appearance.

EXAMPLE 6

A series of foams was prepared using the procedure described in example 1, foam A, and employing the ingredients and proportions set forth in table V below. The resulting foams were of a fine homogeneous cell structure and had the densities shown in table V.

TABLE V

| | Foam Q | R |
|---|---|---|
| Polymethylene polyphenyl polyisocyanate | 134 | 134 |
| BTDA[1] | 45 | 45 |
| Polyol[2] | 10 | 10 |
| Epoxy novolac resin[3] | 20 | 20 |
| Methanol | 2 | 2 |
| HHT[4] | 6 | 6 |
| Triethylene diamine | 3 | 3 |
| Organosilicone surfactant[5] | 1 | 1 |
| Trichlorofluoromethane | — | 10 |
| Density: pcf | 18.5 | 9.8 |

[1]3,3′,4,4′-benzophenone tetracarboxylic acid dianhydride
[2]N,N,N′,N′-tetrakis(2-hydroxypropyl)ethylene diamine
[3]Epon 152
[4]N,N′,N″-tris(dimethylaminopropyl)-s-hexahydrotriazine
[5]DC-2000
[6]cts

We claim:

1. In a process for the preparation of a high-temperature resistant polymer foam by reaction of an organic polyisocyanate and a polycarboxylic derivative containing at least two carboxylic moieties selected from the class consisting of free carboxylic acid groups and anhydride groups, the improvement which comprises carrying out the reaction in the presence of a catalyst combination comprising a tertiary amine and an aliphatic alcohol of from one to six carbon atoms, inclusive.

2. A process according to claim 1 wherein the catalyst combination also comprises a monomeric homocyclic polyepoxide.

3. A process according to claim 1 wherein the catalyst combination also comprises a monomeric homocyclic polyepoxide selected from the class consisting of a polyhydric mononuclear phenol, a polyhydric fused ring phenol, and a nonfused polynuclear polyhydric phenol having the formula:

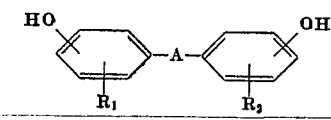

wherein $R_1$ represents from zero to four substituents selected from the class consisting of halogen and lower-alkyl and A is a bridging group selected from the class consisting of

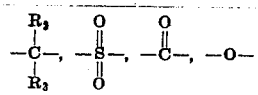

and a single covalent bond, wherein $R_2$ and $R_3$ each represent a moiety selected from the class consisting of hydrogen, lower-alkyl, lower-cycloalkyl and aryl.

4. A process according to claim 1 wherein the tertiary amine employed as catalyst is selected from the class consisting of triethylene diamine, N,N′,N″-trialkylaminoalkyl-hexahydrotriazine, a mono(dialkylaminoalkyl)phenol, a 2,4,6-tri(dialkylaminoalkyl)phenol and mixtures thereof.

5. A process according to claim 1 wherein the aliphatic alcohol is methanol.

6. A process according to claim 1 wherein the polyisocyanate is employed in an amount corresponding to about 0.6 to about 2 equivalents per equivalent of polycarboxylic derivative.

7. A process according to claim 1 wherein the polyisocyanate is a polymethylene polyphenyl polyisocyanate containing from about 35 to about 85 percent by weight of methylenebis(phenyl isocyanate).

8. A process according to claim 1 wherein the polycarboxylic derivative is selected from the class consisting of anhydrides having the following formulae:

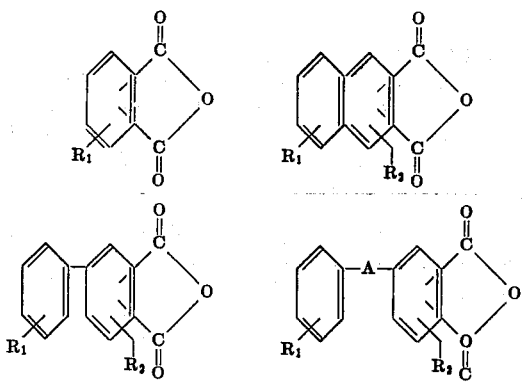

wherein at least one of $R_1$ and $R_2$ represents a group selected from the class consisting of carboxyl and the group

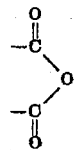

wherein the carbon atoms of the latter are each attached to adjacent carbon atoms in an aromatic ring, and wherein $R_1$ and $R_2$ additionally represent from zero to three substituents selected from the group consisting of halogen and lower-alkyl and A is a bridging group selected from the class consisting of lower-alkylene, carbonyl, sulfonyl and oxygen.

9. ,4,4′ process for the preparation of a cellular polymer containing recurring imide linkages in the molecular chain thereof, said process comprising reacting polymethylene polyphenyl polyisocyanate and 3,3′,4,4′-benzophenone tetracarboxylic acid dianhydride in the presence of a catalyst combination comprising methanol, a monomeric homocyclic polyepoxide, triethylene diamine, and N,N′,N″-tris(dialkylaminoalkyl)-s-hexahydrotriazine.

10. The process of claim 9 wherein said polyepoxide is an epoxy novolac resin.

11. The process of claim 9 wherein said N,N′,N″-tris(dialkylaminoalkyl)-s-hexahydrotriazine is N,N′,N″-tris(dimethylaminopropyl)-s-hexahydrotriazine.

12. A process for the preparation of a cellular polymer containing recurring imide linkages in the molecular chain thereof, said process comprising reacting polymethylene polyphenyl polyisocyanate and trimellitic anhydride in the presence of a catalyst combination comprising methanol, a monomeric homocyclic polyepoxide, triethylene diamine, and N,N',N''tris(dialkylaminoalkyl)-s-hexahydrotriazine.

13. The process of claim 12 wherein said polyepoxide is an epoxy novolac resin.

14. The process of claim 12 wherein said N,N',N''-tris(dialkylaminoalkyl)-s-hexahydrotriazine is N,N',N''-tris(dimethylaminopropyl)-s-hexahydrotriazine.

* * * * *